Aug. 2, 1966   H. J. OSTROWSKI   3,263,495
METHOD FOR CRUSH TESTING
Filed Oct. 14, 1963   2 Sheets-Sheet 1
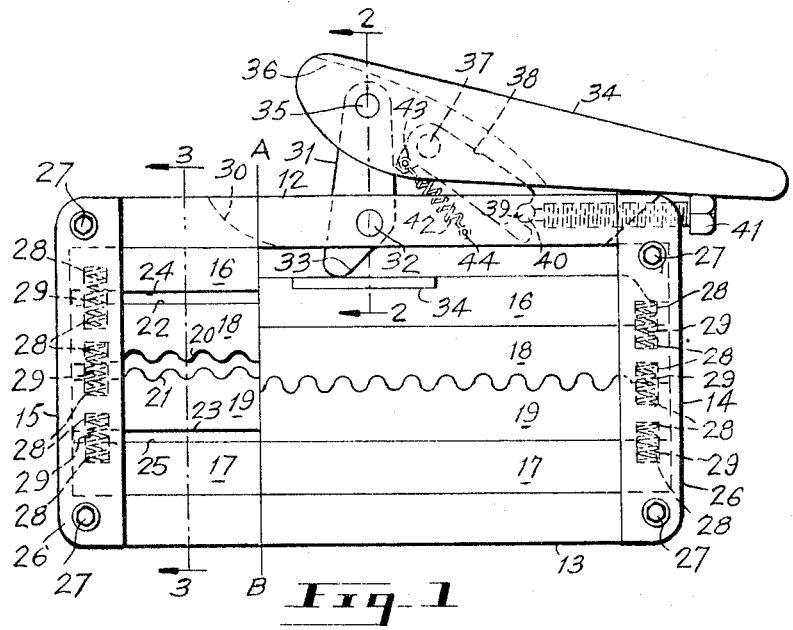
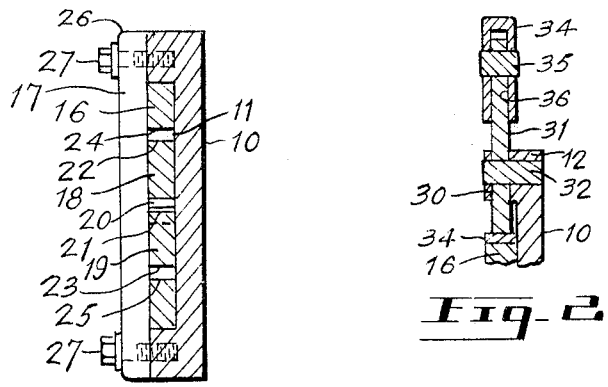
*INVENTOR*
Henry J. OSTROWSKI
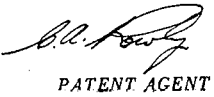
PATENT AGENT Aug. 2, 1966  H. J. OSTROWSKI  3,263,495
METHOD FOR CRUSH TESTING
Filed Oct. 14, 1963  2 Sheets-Sheet 2
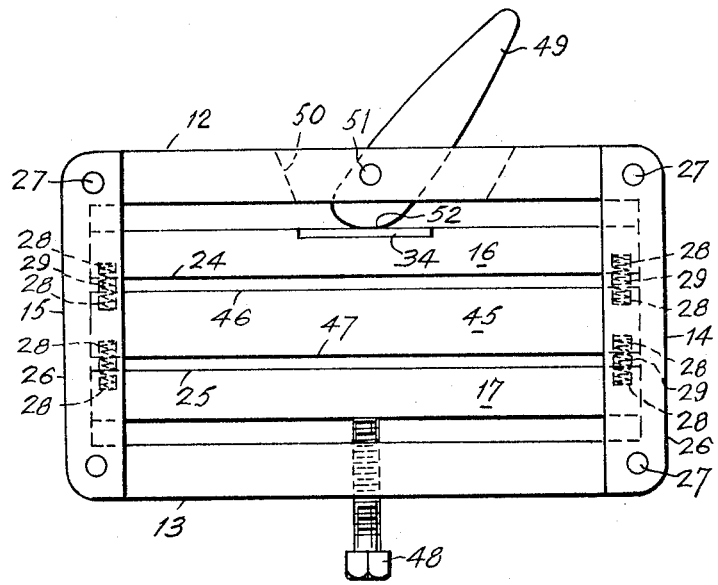
Fig-4
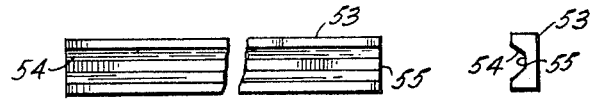
Fig-5  Fig-6
Fig-7
*INVENTOR*
Henry J. OSTROWSKI
*PATENT AGENT*

United States Patent Office 3,263,495
Patented August 2, 1966

3,263,495
METHOD FOR CRUSH TESTING
Henry J. Ostrowski, Port Credit, Ontario, Canada, assignor to Domtar Limited, Montreal, Quebec, Canada, a company of Canada
Filed Oct. 14, 1963, Ser. No. 315,984
2 Claims. (Cl. 73—94)

This invention relates to a method and apparatus for testing paper boards.

Modern warehouse practice makes it increasingly important that corrugated boxes possess sufficient compression strength to withstand heavy loads under high stacking heights. Heretofore work was done to assist mills and box plants in the manufacture and selection of component materials to meet stacking requirements. This work resulted in a new method of testing which is more reliable than the commonly employed ring crush tests (see Canadian Patent 589,073 issued Dec. 15, 1959, to the instant inventor). However, this method was only applicable to the corrugating medium with no consideration of the liners.

Prior investigation did not provide any way to easily and simply test liners and corrugating medium to predict the rigidity of a combined board. Predictions based on ring crush tests of corrugating medium and liners could only be made through a complicated mathematical formula.

The present invention overcomes the above difficulty and provides a simple and efficient method of testing corrugating medium and liners to obtain a prediction of combined board rigidity and an apparatus adapted to carry out said method. Results from tests on corrugating medium and liners may now be simply added to obtain a prediction of combined board strength.

It is therefore an object of this invention to provide a relatively simple, straightforward procedure for testing components materials to predict combined board rigidity.

Another object is the provision of a method and apparatus for testing a liner per se.

It is a further object of this invention to provide a holder for testing of both the liners and corrugating medium individually.

Still another feature is the adjusting mechanism to allow testing of paper boards of various calipers.

It is also an object of this invention to provide straightening bars for more accurate testing of liners.

Further features and advantages will be apparent from the following detailed description in conjunction with the accompanying drawings in which:

FIG. 1 is a plan view of a device suitable for carrying out the method of the invention.

FIG. 2 is a section taken along the line 2—2 of FIG. 1.

FIG. 3 is a section along the line 3—3 of FIG. 1.

FIG. 4 is a plan view of a second embodiment showing only liner testing means and another form of caliper adjusting mechanism.

FIG. 5 is a plan view of a straightener.

FIG. 6 is an end view of the straightener of FIG. 5 and

FIG. 7 is an end view illustrating liners clamped in the device with a straightener in position.

Like reference numerals illustrate like parts throughout the various views.

To the right of line AB in FIG. 1 the holder or clamping means is shown in closed or clamped condition, while at the left of said line AB the holder is shown in receiving or open position.

The apparatus illustrated in FIG. 1 comprises a rectangular base 10 formed with a substantially rectangular depression 11 therein, the depression being enclosed between side walls 12 and 13 and end walls 14 and 15. Mounted for movement within the depression 11 are four clamping bars 16, 17, 18, and 19. The inner pair of said bars 18 and 19 are provided with complementary corrugated gripping surfaces 20 and 21 on their inner faces, while the outer faces of said bars 18 and 19 have straight gripping surfaces 22 and 23 respectively which co-operate with straight faces 24 and 25 formed by edges of bars 16 and 17. With the above arrangement liners may be clamped between surfaces 22 and 24 and surfaces 23 and 25 and corrugating medium is accommodated by surfaces 20 and 21. It is also possible to remove member 17 and use the edge of side wall 13 in place of gripping surface 25.

The gripping members or clamping bars are retained in position in the depression 11 by cover members 26. These cover members overlie the ends of the depression 11 and the end walls 14 and 15 and are held in position by screws 27. (See FIGS. 1, 3, and 4.)

Springs 28 fitted in sockets 29 in opposing complementary gripping faces of the bars 16, 17, 18, and 19 bias the bars apart for easy insertion of specimens between the clamping faces.

In the embodiment of FIGS. 1 and 2 there is shown a specific type of adjusting and closing mechanism capable of adapting the device for various calipers of board. The side member 12 is provided with a slot 30 accommodating linkages of the adjusting mechanisms. This mechanism includes a lever 31 extending through slot 30 and mounted in side wall 12 on pivot 32. Lever 31 is provided with a camming surface 33 which co-operates with a wear plate 34 on bar 16 to move the clamping bars into gripping position.

The lever 31 is pivoted adjacent to the end opposite surface 33 to a manipulating lever 34 by pivot 35. In the disclosed embodiment lever 31 is fitted within a slot 36 in the lever 34. Also fitted within said slot 36 and pivoted at one end to lever 34 on pin 37 is a link 38. The opposite end of link 38 slides in the slot 30 of member 12 and has a socket 39 which is engaged by a ball 40 of adjusting screw 41. This screw 41 is in threaded engagement with the holder or testing mechanism for screw adjustment of the position of the ball 40. Thus the link 38 is pivoted at one end on pin 37 and at the other end on an adjustable pivot comprising the ball 40 and socket 39. One end of a spring 42 is attached to a lug 43 on link 38 adjacent pin 37, while the other end of said spring is anchored to the holder within the slot 30 by pin 44. The spring 42 functions to maintain the socket 39 seated on ball 40 of adjusting screw 41.

By threading the screw 41 into or out of the holder the point of contact between the camming surface 33 and the wear plate 34 is varied to thereby adjust the holder or testing mechanism for different caliper of paperboards.

Corresponding parts from FIG. 1 used in the embodiment of FIG. 4 bear corresponding numerals and therefore only the differences in structure will be described.

In the embodiment of FIG. 4 the bars 18 and 19 have been substituted by a single bar 45 with opposite side edges thereof forming gripping surfaces 46 and 47. Surfaces 24 and 46 co-operate with one another as do surfaces 25 and 47 to clamp liners therebetween for testing.

The adjustment and closing or clamping means shown in FIG. 4 constitutes two separate parts. The adjustment means include a screw 48 extending through and in threaded engagement with side member 13, said screw has one end abutting the bar 17. Thus by threading screw 48 in and out of the side wall 13 the holder or testing mechanism may be adjusted to accommodate various caliper of liners.

Clamping of specimens in the holder is accomplished by lever 49 extending through a slot 50 similar to slot 30 in member 12 and pivoted to said member 12 on a pivot pin 51. This lever 49 has a cam surface 52 which engages plate 34 on bar 16 whereby manipulation of lever 49 closes the bars 16, 17 and 45 to clamp specimens between the clamping surfaces.

FIGS. 5 and 6 illustrate a straightening device to relieve buckling of a liner or liners being tested. The straightener consists of a bar 53, having a tapered groove 54 with a flat base 55, extending longitudinally on one face of said bar. Tapering of groove 54 merely facilitates applying the straightener to the test material.

In operation specimens cut to size are inserted between the clamping bars and are securely clamped therein. The testing device with samples clamped therein is then conveyed to a press where pressure is evenly applied along the length of the specimen by a hydraulic ram or the like. The load required to crush the specimen is recorded.

With the present invention one is now able to test liners per se to obtain an indication of their contribution to the strength of a corrugated board. Also with the device of FIG. 1 a test of a corrugating medium per se may be made.

The testing device may also be used for testing boxboard especially high caliper boards.

It is desirable to use the straightener of FIGS. 5 and 6 when testing liners to reduce buckling during testing. In operation the straightening device is applied to the clamped liners in the manner shown in FIG. 7 so that the liners are nested in the groove 54 with their ends abutting the flat base 55. Testing pressure is applied to the liners through the straightener 53. If the straightener is not used the degree of accuracy of the test is reduced due to buckling. However, with high caliper boards the accuracy is not affected as much as with low caliper board when the straighteners are not used.

In place of the straightener one could also cut a similar groove for each pair of liners tested into the pressure plate of the pressure applying means.

In order to provide a system allowing addition of the test results from a corrugated medium and a liner test, many test procedures were experimented with. The following procedure gave substantially the highest degree of reproducibility and was the only procedure allowing addition of results to obtain a prediction of combined board strength. Tests with a different number and arrangement of liners did not give results to make the tests additive so that the sum would correspond substantially to the results of a short column test described later in the specification.

Conditioned strips of liner material 6 x ½ in. or 12 x ½ in. are cut in the machine direction and sub cut to 3 in. These 3 in. sample pieces are then arranged in pairs with the top side of the sample facing outwards (i.e., the filler sides facing each other) and are placed between the straight gripping edges so that ¼ in. of the sample extends above the bars. The samples are now clamped and the assembly including the holder with the liners is placed with the straighteners in position under a pressure applying means and the samples crushed. A record is made of the maximum reading at failure. Two pairs of liners 3 in. in length provide a total of 1 ft. of liner under test which allows convenience in handling the results.

Results from the above test on liners may merely be added to the test results obtained from tests on corrugated medium tested in accordance with Canadian Patent 589,073 referred to above to obtain a prediction of the combined strength of a corrugated board. Heretofore no systems enabling simple calculation to predict combined board strength was available. It is of course necessary to convert the results from the tests of the corrugating medium and liners so that they represent lengths of the various components in the same proportions they appear in the finished product. When testing liners more pressure is usually required to clamp the lines than is required when testing medium. To obtain an even pressure it may be advantageous to provide a set of springs or a rubber insert against which the clamping member 17 of FIG. 1 could be forced.

The following test was devised to correlate the combined component stiffness with the short column stiffness.

Liners were cut in the machine direction to exactly ¼ inch width (checked to 1 point by a micrometer) and then cut to 3¾ lengths. Delpex adhesive 2222 (latex of the self-sealing type with little or no rigidity) was applied to the inside of the liners and on the flute tops of the medium and the components were dried in an oven at 220° F. for 1 minute. The two liners were then affixed one to each side of the medium extending from adjacent one edge to the centre of the medium (the medium was ½ inch wide) while the medium was held in the holder. The thus assembled specimen was allowed to condition and then was placed in the corrugated portion of a holder on the jaws of which masking tape had been applied aligned parallel with the bottom of the liners to limit any tendency for the lines to spread during the test. The holder and sepcimen were then placed in a press and the specimen crushed and the maximum reading was recorded.

Table I gives a comparison of the results obtained by adding component test results with those obtained from the above described short column test.

*Table 1*

| Liner Grade | Liner Stiffness, lbs./ft. | 26#S.C. Medium Stiffness, lbs. | Combined Strengths | |
| --- | --- | --- | --- | --- |
| | | | Calculated from components* | Actual by Combined Test |
| 1. 26#KR | 29.2 | 68.0 | 86.3 | 104.1 |
| 2. 37½#KR | 50.8 | 68.0 | 99.8 | 106.3 |
| 3a. 42#KR | 97.2 | 68.0 | 129.0 | 131.3 |
| 3b. 42#KR | 97.2 | 85.8 | 146.6 | 151.8 |
| | | 33#S.C. | | |
| 4. 69#KR | 231.4 | 68.0 | 212.6 | 197.4 |
| 5. 37½#KR | 60.6 | 69.2 | 107.0 | 115.0 |
| 6. 37½#KR | 60.6 | 93.2 | 131.0 | 137.0 |
| 7. 33#KR | 66.5 | 93.2 | 132.5 | 131.5 |

*In obtaining the calculated results it is of course necessary to reduce the results from the liner test to the same length as the other tests. For example item 3(a) from Table I the calculated column compression = (97.2 ×7.5/12)+68.0=129.0 lbs.

From the above table it is evident that the test of individual components may be merely added to obtain a production of combined board strength. Also the percent contribution of the liners and corrugating medium may also be determined.

In the above example it was necessary to convert the results so that each would be represented in the length that they would appear in a combined board. If the test were conducted on lengths as they would appear in the combined board this conversion would not be necessary. This would slightly reduce the accuracy of the liner test as a shorter length of liner would be tested if one is to keep the apparatus of a size to operate with other standard testing equipment.

Thus in the embodiment shown in FIG. 1 there is shown a device allowing testing of liners or corrugating medium individually.

In FIG. 4 a device for holding liners per se is shown. It is conceivable that only a single pair of clamping surfaces may be provided for testing liners individually or in pairs.

Thus applicant has disclosed a new type of holder allowing testing of liners and a novel method of testing wherein the results of testing liners may merely by added to the results of a test on corrugating medium to obtain an accurate prediction of the strength of a combined board.

What I claim is:

1. A method of testing liners for corrugated paper board comprising firmly clamping the longitudinal edges of a pair of prepared liner samples between a pair of clamping surfaces, said samples being positioned such that the filler sides of said samples face inwardly toward each other, said samples projecting above the top edge of said surfaces, applying a straightener bar to the longitudinal edges of said samples that project above said surfaces, and applying a compressive force to said samples through said straightener in a direction parallel to the faces of said samples to crush said samples.

2. A method of predicting the combined board strength of a corrugated board from tests on component parts comprising clamping the longitudinal edge of a prepared sample of a corrugated medium between a pair of corrugated grippers such that a portion of the sample extends above the grippers, applying a compressive force in a direction parallel to the corrugations to crush the sample widthwise, noting the highest force required to crush the sample, clamping the longitudinal edges of a prepared pair of liner samples between a pair of straight edged grippers such that a portion of said liner samples extends above said straight edged grippers, said pair liner samples being positioned in said grippers so that their filler sides face inwardly toward each other, applying a straightener to the edges of said pair of liner samples, applying a compressive force to said liner samples through said straightener in a direction parallel to the faces of said liner samples to crush said liner samples, noting the highest force necessary to crush said liner samples, and adding the highest force required to crush the medium sample to that required to crush the liner samples to obtain a prediction of the combined board strength.

References Cited by the Examiner

UNITED STATES PATENTS

| | | | |
|---|---|---|---|
| 1,279,011 | 9/1918 | Sanford | 269—236 X |
| 1,445,963 | 2/1923 | La Batt et al. | 73—102 X |
| 2,662,433 | 12/1953 | Braun | 269—153 |
| 3,041,873 | 7/1962 | Godshall | 73—93 |

FOREIGN PATENTS

| | | |
|---|---|---|
| 389,073 | 12/1959 | Canada. |
| 242,965 | 2/1911 | Germany. |

RICHARD C. QUEISSER, *Primary Examiner.*

G. M. GRON, *Assistant Examiner.*